US008735526B2

(12) United States Patent
Verborgt et al.

(10) Patent No.: US 8,735,526 B2
(45) Date of Patent: May 27, 2014

(54) POLYENUREAS AND METHOD OF MAKING THE SAME

(75) Inventors: Jozef Verborgt, Tarpon Springs, FL (US); Arthur Webb, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 177 days.

(21) Appl. No.: 11/229,432

(22) Filed: Sep. 15, 2005

(65) Prior Publication Data

US 2007/0060733 A1    Mar. 15, 2007

(51) Int. Cl.
*C08G 18/38*    (2006.01)
*C08G 18/32*    (2006.01)
*C08G 18/42*    (2006.01)
*C08G 18/48*    (2006.01)
*C09D 175/02*   (2006.01)

(52) U.S. Cl.
USPC .................. 528/44; 528/49; 528/76; 528/80; 528/85

(58) Field of Classification Search
USPC ........... 528/60, 62, 65, 66, 80, 68, 85, 44, 49, 528/76
See application file for complete search history.

(56) References Cited

U.S. PATENT DOCUMENTS

| | | | | |
|---|---|---|---|---|
| 3,479,310 | A | * | 11/1969 | Bayer et al. ................. 524/591 |
| 3,553,118 | A | | 1/1971 | Brizgys |
| 3,835,191 | A | * | 9/1974 | Wagner et al. ............... 558/430 |
| 4,009,307 | A | * | 2/1977 | Erikson et al. ............... 427/377 |
| 4,391,958 | A | | 7/1983 | Minato et al. |
| 5,115,045 | A | | 5/1992 | Gillis et al. |
| 5,126,170 | A | | 6/1992 | Zwiener et al. |
| 5,236,741 | A | | 8/1993 | Zwiener et al. |
| 5,569,706 | A | * | 10/1996 | Jacobs et al. ................. 524/591 |
| 5,955,199 | A | * | 9/1999 | Johnson et al. ............. 428/423.1 |
| 6,423,425 | B1 | | 7/2002 | Faucher et al. |
| 2004/0010076 | A1 | | 1/2004 | Sugiyama et al. |
| 2005/0271881 | A1* | | 12/2005 | Hong ........................ 428/423.1 |
| 2006/0122352 | A1* | | 6/2006 | Burckhardt .................... 528/44 |

FOREIGN PATENT DOCUMENTS

| | | |
|---|---|---|
| GB | 1110655 | 4/1968 |
| GB | 1110655 | 5/1968 |
| GB | 1486790 | 9/1977 |
| JP | 52045773 B4 | 11/1977 |
| WO | WO 2004/013200 A1 * | 2/2004 |

OTHER PUBLICATIONS

Satomi et al, "Xylenediamine fungicides", SciFinder, Jul. 8, 2005, pp. 1-2.
Lee et al, "Aldimine-Isocyanate Chemistry: A Foundation for High Solids Coatings", Waterborne, Higher-Solids and Powder Coatings Symposium, Feb. 22-24, 1995.
Homann et al, "Novel Super High Solids Polyurethane Topcoat for Protective Coatings with Increased Productivity", Mar. 9, 2004.
Wicks et al, "Amine Chemistries for Isocyanate-Based Coatings" Progress in Organic Coatings, 1997, vol. 30, pp. 265-270.
Bock et al, "New Developments in Polyketimine-Polyisocyanate Coatings—Their Chemistry and Applications", Journal of Coatings Technology, Dec. 1987, vol. 59, No. 755, pp. 131-135.
Suzuki et al, "Diethyl Ketone-Based Imine as Efficient Latent Hardener for Epoxy Resin" Journal of Applied Polymer Science, 2002, vol. 83, pp. 1744-1749.
Van der Van et al, "Curing chemistry and film properties of Ketimine/aldimines/isocyanate coatings",SciFinder, Jul. 8, 2005.
Lee et al., "Aldimine-Isocyanate Chemistry: A Foundation for High Solids Coatings" Waterborne, Higher-Solids and Powder Coatings Symposium, Feb. 22, 1995.
Homann et al., "Novel Super High Solids Polyurethane Topcoat for Protective Coatings with Increased Productivity" Mar. 9, 2004.
Wicks et al., "Amine Chemistries for Isocyanate-Based Coatings" *Progress in Organic Coatings*, 1997, 30, 265-270.
Bock et al., "New Developments in Polyketimine-Polyisocyanate Coatings—Their Chemistry and Applications" *J. Coatings Technol.*, (1987), 59(755), 131-135.
Suzuki et al., "Diethyl Keton-Based Imine as Efficient Latent Hardener for Epoxy Resin" *J. Appl. Poly. Sci.*, 2002, 83, 1744-1749.
Van Der Ven et al., "Curing chemistry and film properties of ketimine/aldimines/isocyanate coatings" 215th ACS National Meeting, Mar. 29, 1998 (abstract).

* cited by examiner

*Primary Examiner* — Rabon Sergent
(74) *Attorney, Agent, or Firm* — US Naval Research Laboratory; Joseph T. Grunkemeyer

(57) ABSTRACT

A method of making a polymer by providing an imine and reacting the imine with a polyisocyanate in the presence of a hydroxyl group. The imine is a polyaldimine, hydroxyaldimine, polyketimine, or hydroxyketimines. The polymer has urea linkages formed from the imine and polyisocyanate and urethane linkages formed from the hydroxyl group and the polyisocyanate. The polymer has at least as many urea linkages as urethane linkages. A polymer having urea units and urethane units having a molar ratio of at least about 2:1. A polymer comprising a urea-urethane repeat unit.

20 Claims, No Drawings

POLYENUREAS AND METHOD OF MAKING THE SAME

BACKGROUND OF THE INVENTION

1. Field of the Invention

The invention relates generally to polyenureas and methods of making them.

2. Description of the Related Art

Ketimines or blocked amines are known in the coating industry as curing agents for epoxy resins. Ketimines are the reaction products of amines or diamines with ketones splitting off water. The reaction is completely reversible, and in contact with humidity of the atmosphere the ketimines pick up water and split off the ketone (blocking agent) and the resulting free amine groups will react with the epoxy resin. This means that curing of epoxies with ketimines always results in the release of substantial amounts of volatile materials.

Aldimines are similar to the ketimines except that an aldehyde such as butyric aldehyde is used as the blocking agent. The reverse reaction with atmospheric humidity is less pronounced and as such aldimines are not used as curing agents for epoxies.

When aldimines or ketimines are added to isocyanate curing agents they react in a very similar way as with epoxy resins. They pick up water and the blocking agents are slowly released. The free amines then subsequently react with the isocyanate groups to form ureas. The reaction is however cumbersome as traces of free amines in the ketimine/aldimine make mixing a rather difficult exercise. The curing is also typified by a kind of skinning, i.e. a very strong skin forms at the surface, which protects the underlying mixture from further curing. It takes many days to fully cure isocyanates this way. This reaction mechanism can be typified as a moisture curing reaction and again splits of substantial amounts of volatile material.

Zwiener et al. (U.S. Pat. Nos. 5,126,170 and 5,236,741. All referenced patent documents and publications are incorporated herein by reference) describe the use of aldimines up to a level of 5 to 10% as a catalyst for curing polyols with isocyanates giving a long pot life and excellent mechanical properties. However, this patent does not deal with the use of totally solvent free coatings. It mentions the use of aldimines as a catalytic agent in the formation of polyurethanes.

Lee et al. ("Aldimine-Isocyanate Chemistry: A Foundation for High Solids Coatings," *Waterborne, Higher-Solids, and Powder Coatings Symposium* (Feb. 22-24, 1995)) points out that at elevated temperatures (80° C.) there is a kind of tautomerism taking place whereby the aldimines form enamines, a form of unsaturated amines. These enamines subsequently react with isocyanate groups to form the corresponding polyenurea, a new class of polyureas. Lee also states that several other reaction paths do exist forming different ring structures whereby one aldimine group reacts with either one or two isocyanate groups, and suggests the use of aldimines as co-reagents in order to increase the solids of polyurethane coatings.

SUMMARY OF THE INVENTION

The invention comprises a method of making a polymer comprising providing an imine and reacting the imine with a polyisocyanate in the presence of a hydroxyl group. The imine is selected from the group consisting of polyaldimines, hydroxyaldimines, polyketimines, and hydroxyketimines. The polymer comprises urea linkages formed from the imine and polyisocyanate and urethane linkages formed from the hydroxyl group and the polyisocyanate. The polymer comprises at least as many urea linkages as urethane linkages.

The invention further comprises a polymer comprising urea units and urethane units. The urea unit comprises the formula:

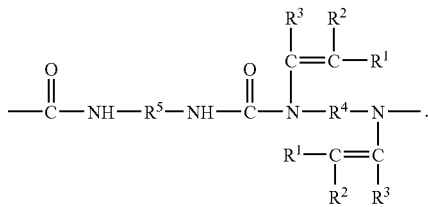

The urethane units comprise one or more moieties selected from the group consisting of

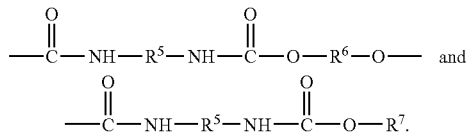

Each $R^1$, $R^2$, and $R^3$, is a moiety independently selected from the group consisting of H, organic group, and covalent bond to any other of $R^1$, $R^2$, and $R^3$. $R^4$, $R^5$, $R^6$, and $R^7$ are independently selected organic groups. The molar ratio of urea units to urethane units in the polymer is at least about 2:1.

The invention further comprises a polymer comprising a urea-urethane repeat unit comprising the formula:

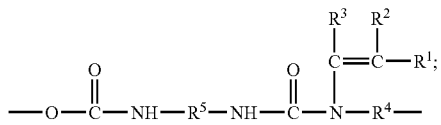

$R^1$, $R^2$, $R^3$, $R^4$, and $R^5$ are as defined above.

The invention further comprises an aldimine comprising the formula:

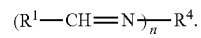

$R^1$, $R^4$, and n are, as a set, selected from the group consisting of propyl, xylylene, and 2; isopropyl, xylylene, and 2; propyl, 2-methyl-1,5-pentylene, and 2; and propyl, 2-(2-hydroxyethyl)ethoxy, and 1.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Unlike ureas, enureas may be made from starting materials with an extremely low viscosity, controllable curing speeds, and outstanding UV resistance. Use of these enureas can result in coatings that possess manageable formulation characteristics and can be easily formulated into totally solvent free coatings capable of being sprayed using conventional and plural component spray application equipment. Other methods of application include, but are not limited to, brushing, rolling, and drawdown blading.

Very though and weatherable coatings may be made by reacting polyisocyanates with aldimines and ketimines using relatively small amounts of glycols or polyols as catalysts. The reaction may proceed very quickly at ambient temperature and may be virtually complete in 24 hours. The reaction can proceed essentially without splitting off any volatile material and as such constitute solvent free coating, a class called solvent free polyenureas. The aldimines or ketimines are not used as a co-reagent but as the principal reagent to cure the isocyanates and all this in a solvent free system with no release of the blocking agents. The coatings do not require the use of metal catalysts for curing such as those required for most polyurethane-based exterior coatings.

The coatings may be applied using plural component spray application at ambient temperatures and can be pigmented with any existing commercially available or other pigments. The coatings may also accept most metallic pigments as well and can be formulated to exhibit gloss ranges from near flat to a maximum of 95% or greater.

The coatings may be modified using both existing and potentially new materials to provide corrosion control. The coatings may incorporate alternative materials to effect corrosion control such and to arrest filliform corrosion on aluminum alloys and general undercutting as is evidenced on steel alloys.

Some of the polyenureas exhibit cure times ranging from 15 minutes to one hour, depending on the chemistry employed. In general the coatings may be hard enough to handle within 10 minutes and may support foot traffic within one hour. However after 24 hours of ambient cure, the coating may be baked at a nominal about 65° C. to increase the glass transition temperature ($T_g$) which may provide a harder surface. However baking can result in a reduction in overcoat compatibility which would require abrasion of the surface if more than one coat of product is desired such as would be the case when using a primer and a color topcoat.

The following reaction mechanism is only a proposed mechanism and is not intended to limit the scope of the claims. The reaction involves reacting certain imines with polyisocyanates in the presence of a hydroxyl group. The hydroxyl group may be found in a separate alcohol compound, or it may be part of the imine. The imine may be one of two tautomers in equilibrium as shown in Eq. (1). Only one imine group is show, but more may be bonded directly or indirectly to the $R^4$ group.

$$R^1-\overset{R^2}{\underset{}{C}}H-\overset{R^3}{\underset{}{C}}=N-R^4- \rightleftharpoons R^1-\overset{R^2}{\underset{}{C}}=\overset{R^3}{\underset{}{C}}-NH-R^4- \quad (1)$$

The hydroxyl groups may act as a catalyst to shift the equilibrium to the right. The right-hand tautomer contains an amino hydrogen that may be highly reactive with isocyanate to produce a urea linkage, as shown in Eq. (2). Only one isocyanate group is show, but more may be bonded directly or indirectly to the $R^5$ group.

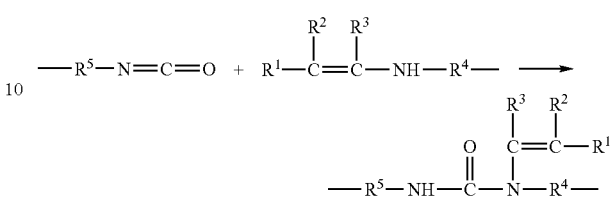

(2)

Since amino hydrogens are generally more reactive then hydroxyl groups with isocyanate, little to none of the hydroxyl groups may be consumed early in the reaction. Thus, only a catalytic amount of hydroxyl groups may be needed. As the reaction proceeds, fewer amino hydrogens are available, and so there is some reaction of the hydroxyl groups with the isocyanate groups to form urethane linkages, as shown in Eqs. (3) and (4). Eq. (3) shows the reaction with a glycol, in which case the glycol may crosslink the polymer. Eq. (4) shows the reaction with a monohydroxyl alcohol, which is a terminating group. Since a catalytic amount of hydroxyl groups is used, the polymer has more urea groups than urethane groups, including but not limited to, at least a 2:1 or at least a 3:1 ratio of urea linkages to urethane linkages. This can result by using a stoichiometric excess of imine groups with respect to the hydroxyl groups.

$$2 \quad -R^5-N=C=O + HO-R^6-OH \rightarrow \quad (3)$$
$$-R^5-NH-\overset{O}{\underset{\|}{C}}-O-R^6-O-\overset{O}{\underset{\|}{C}}-NH-R^5-$$

$$-R^5-N=C=O + HO-R^7 \rightarrow \quad (4)$$
$$-R^5-NH-\overset{O}{\underset{\|}{C}}-O-R^7$$

When the hydroxyl group is part of a monoimine, the urea and urethane linkages are both formed from the imine compound as shown in Eq. (1). If no other imine compound is present, the polymer will have the same number of urea groups and urethane groups.

(1)

The reaction may be performed with a mixture of imines, hydroxyimines, glycols, alcohols, and polyisocyanates. An example portion of a polymer structure resulting from all of these reactants is shown in Eq. (6). As any of these reactants may also be a combination of different such reactants, each of the R groups may potentially be different.

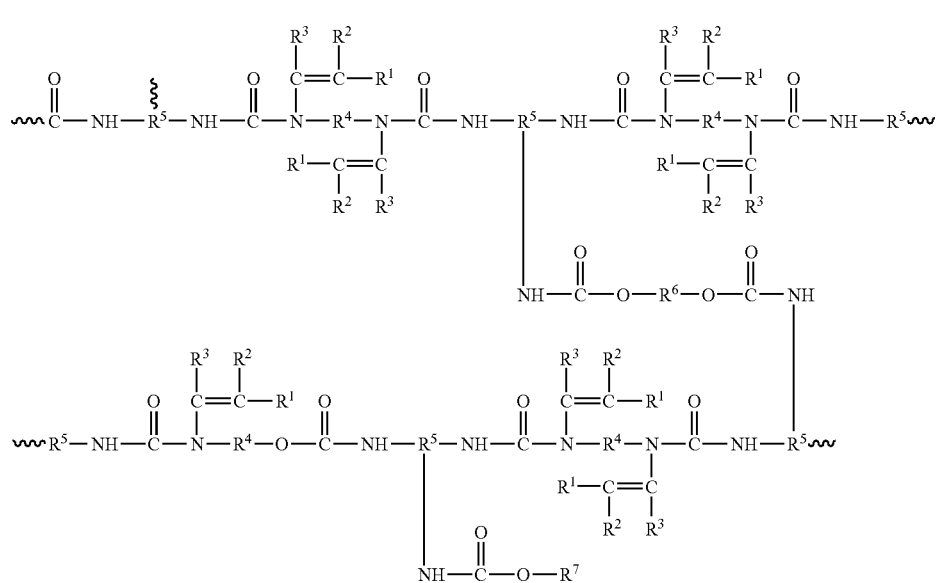

(6)

The reactants may have relatively low viscosities. Thus the reaction may be performed in the substantial absence of solvent or in a lack of solvent. When no solvent is used, no volatile compounds are released during the reaction. Lower amounts of alcohol may result in slower curing systems and higher amounts in faster curing systems. Adding organic acids groups may further accelerate the curing reaction.

The imine may be made by reacting an amine with a carbonyl-containing compound according to methods known in the art for making aldimines and ketimines. The amine is a primary polyamine and/or a hydroxyl-containing primary amine, which may also be a polyamine. Carbonyl-containing compounds include aldehydes, ketones, and combinations thereof. The compound may contain both aldehyde and ketone groups. When a polyamine is used, the result is a polyaldimine or polyketimine. When a hydroxyl-containing amine is used, the result is a hydroxyaldimine or hydroxyketimine. Suitable amines include, but are not limited to, xylylene diamine, ethylene diamine, 1,2-cyclohexane diamine, 2-methyl-1,5-pentylene diamine, polyoxyalkyleneamines, and diglycol amine.

The identity of the $R^1$, $R^2$, and $R^3$ groups depends on the aldehyde or ketone used. One or two of these groups may be only a covalent bond to one of the other groups, as when the aldehyde or ketone is a cyclic compound. Suitable carbonyl-containing compounds and their corresponding $R^1$, $R^2$, and $R^3$ include, but are not limited to, isobutyric aldehyde (ethyl, H, and H), butyric aldehyde (methyl, methyl, and H), methyl ethyl ketone (methyl, H, and methyl), methyl isobutyl ketone (ethyl, methyl, and methyl), acetone (H, H, and methyl), and cyclohexanone (1,4-butylene, H, and covalent bond to $R^1$). Eq. (7) shows the structures of the aldimines covered within the general structure of the claimed aldimines.

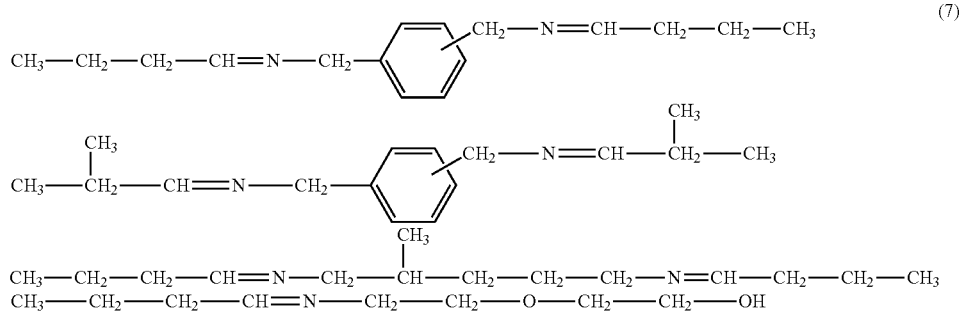

(7)

The hydroxyl group may be provided in a separate compound as an alcohol, including glycols. In addition to catalyzing the reaction, the alcohol may also serve to alter the viscosity of the reaction mixture. Adding ethoxylate, propoxylate, acrylic or polyester polyol, or caprolactone adduct may increase the viscosity. Suitable alcohols include, but are not limited to, primary alcohols, ethylene glycol, propylene glycol, butane diol, benzyl alcohol, caprolactone adducts, ethoxylates, propoxylates, hydroxyl-containing acrylic resins, and hydroxyl-containing polyester resins. A residue of the alcohol refers to the part of the alcohol aside from the hydroxyl group(s). In general the reaction of ketimines and aldimines with aliphatic isocyanates may require the use of primary alcohols or glycols. The reaction with aromatic isocyanates can be much more violent and may be catalyzed with secondary hydroxyl groups.

A wide range of polyisocyanate may be used including, but not limited to, aliphatic, and aromatic polyisocyanates. Such isocyanates and their reaction conditions are known in art. A stoichiometric excess of isocyanate groups may be used with respect to the total number of imine groups and hydroxyl groups. This is to assure that most or all of the hydroxyl groups are eventually consumed.

Having described the invention, the following examples are given to illustrate specific applications of the invention. These specific examples are not intended to limit the scope of the invention described in this application.

Example 1

Aldimine Formed from m-Xylylene Diamine and Isobutyric Aldehyde

In a three-necked flask were added four moles of m-xylylene diamine (544 grams). 8 moles of isobutyric aldehyde were added under cooling in an ice bath. The reaction was complete almost instantaneously and the reaction water was separated at the bottom of the reactor. The resulting aldimine was decanted and dried over molecular sieves to remove the last traces of reaction water. Alternatively the aldimine can be dried by azeotropic distillation with cyclohexane. The crude aldimine is very light in color and can be used as such but can also be vacuum distilled for further purification. Boiling point: 124° C. at 10 mm Hg.

Example 2

Aldimine Formed from 2-Methyl Pentamethylene Diamine and Isobutyric Aldehyde

The same procedure as in Example 1 was used to make this aldimine. The crude product is water white in color and can be used as such but can also be vacuum distilled for further purification.

Example 3

Aldimine Formed from Diglycol Amine and Isobutyric Aldehyde

In a three-necked flask were added 5 moles of diglycol amine. 5.5 moles of isobutyric aldehyde were then added under cooling. The reaction was virtually complete after the addition of the aldehyde. The reaction water and excess of isobutyric aldehyde was removed by azeotropic distillation with cyclohexane. The crude product can be purified easily by vacuum distillation.

Example 4

Ketimine Formed from m-Xylylene Diamine and Methyl Isobutyl Ketone

In a three-necked reactor were added 4 moles of m-xylylene diamine. A slight excess of 8.5 moles of methyl isobutyl ketone were added and the reaction water was removed by azeotropic distillation with cyclohexane. The crude product can be vacuum distilled at 10 mm Hg.

Example 5

Other Ketimines

The same procedure as in Example 4 was used to make the ketimines of cyclohexanone and xylylene diamine and diglycolamine.

Example 6

Curing with Diethylene Glycol

Aldimines made from m-xylylene diamine, Dytek A, ethylene diamine, and 1,2-cyclohexane diamine with isobutyric aldehyde were used in separate experiments. In a plastic cup were mixed 0.3 moles of aldimine and 0.1 mole of diethylene glycol. To this mixture was added 0.8 equivalent weights of Desmodur N3600. The resulting mixture was stirred vigorously and spread out by pouring, brushing, and rolling. It was tack free in less than 10 minutes.

Example 7

Curing with Diglycol Amine

Aldimines made from m-xylylene diamine, Dytek A, ethylene diamine, and 1,2-cyclohexane diamine with isobutyric aldehyde were used in separate experiments. In a plastic cup were mixed 0.3 moles of the aldimine of diglycol amine with 0.5 to 0.6 equivalent weights of Desmodur N 3600. The resulting mixture was spread out by pouring, brushing, and rolling and was tack free in some 15 minutes.

Example 8

Aging Studies

Clear coats made from the isobutyric aldimine of xylylene diamine, Dytek A, and diglycol amine with Desmodur N 3600 were subjected to accelerated UV testing in a QUV meter. No appreciable yellowing or deterioration was observed after some 2000 hrs.

Similar castings were made from pigmented aldimines with $TiO_2$. The castings gave excellent results in the QUV meter after some 2000 hrs.

In general aldimines resulted in much better weatherability than the corresponding ketimines. Aldimines also seemed to have a better shelf life than their corresponding ketimines and remained water white where ketimines tended to yellow over time.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A method of making a polymer wherein the polymer is made by performing a reaction in a mixture comprising:
   1) an imine selected from polyaldimines, hydroxyaldimines, polyketimines, and hydroxyketimines;
      wherein the polyaldimine is made by reacting ethylene diamine, 2-methyl-1,5-pentylene diamine, or a polyoxyalkyleneamine with an aldehyde;
      wherein the hydroxyaldimine is made by reacting diglycol amine with an aldehyde;

2) a polyisocyanate; and 3) a hydroxyl compound, if the imine is not a hydroxyimine;

wherein the hydroxyl compound is an alcohol, a glycol, or a polyol;

wherein the polymer comprises urea linkages formed from the imine and polyisocyanate;

wherein the polymer comprises urethane linkages formed from the hydroxyl group of the hydroxyimine or the hydroxyl compound and the polyisocyanate;

wherein the reaction is performed in the absence of solvent;

wherein the reaction forms a crosslinked coating; and wherein the molar ratio of urea linkages to urethane linkages is at least 2:1.

2. The method of claim 1, wherein the aldehyde is isobutyric aldehyde or butyric aldehyde.

3. The method of claim 1, wherein the hydroxyl compound is selected from the group consisting of primary alcohols, ethylene glycol, propylene glycol, butane diol, benzyl alcohol, caprolactone adducts, ethoxylates, propoxylates, hydroxyl-containing acrylic resins, and hydroxyl-containing polyester resins.

4. The method of claim 1, wherein the molar ratio of urea linkages to urethane linkages is at least 3:1.

5. The method of claim 1, wherein a stoichiometric excess of isocyanate groups is used with respect to the total number of imine groups and hydroxyl groups.

6. The method of claim 1, wherein a stoichiometric excess of imine groups is used with respect to the hydroxyl groups.

7. The method of claim 1, wherein the hydroxyl compound is a glycol.

8. The method of claim 7, wherein the glycol is diethylene glycol.

9. A polymer comprising urea units and urethane units;

wherein the urea unit comprises the formula:

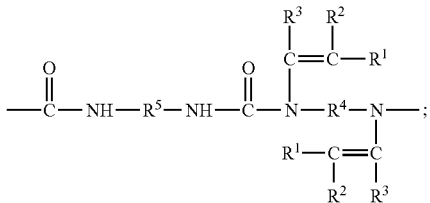

wherein the urethane units comprise one or more moieties selected from the group consisting of

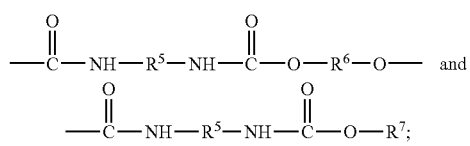

wherein each $R^1$, $R^2$, and $R^3$, is a moiety independently selected from the group consisting of H, organic group, and covalent bond to any other of $R^1$, $R^2$, and $R^3$;

wherein no more than one of $R^1$, $R^2$, and $R^3$ is a covalent bond;

wherein $R^4$ is ethylene or 2-methyl-1,5-pentylene;

wherein $R^6$ and $R^7$ are independently selected organic groups;

wherein the polymer is made by performing a reaction in a mixture comprising:

1) an imine selected from polyaldimines and polyketimines;

2) a polyisocyanate; and 3) a hydroxyl compound;

wherein the hydroxyl compound is an alcohol, a glycol, or a polyol;

wherein the polyisocyanate has at least three isocyanate groups;

wherein $R^5$ is an organic group that comprises at least one isocyanate group reacted with the imine or hydroxyl compound;

wherein the reaction forms a crosslinked coating; and wherein the molar ratio of urea units to urethane units in the polymer is at least about 2:1.

10. The polymer of claim 9, wherein the

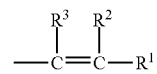

group is —CH=CH—CH$_2$—CH$_3$, —CH=C(CH$_3$)—CH$_3$, —C(CH$_3$)=CH—CH$_3$, —C(CH$_3$)=C(CH$_3$)—CH$_2$—CH$_3$, —C(CH$_3$)=CH$_2$, or

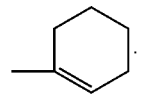

11. The polymer of claim 9, wherein the polyisocyanate is selected from the group consisting of aliphatic polyisocyanates and aromatic polyisocyanates.

12. The polymer of claim 9, wherein $R^6$ is a residue of a glycol selected from the group consisting of primary alcohols, ethylene glycol, propylene glycol, butane diol, hydroxyl-containing acrylic resins, and hydroxyl-containing polyester resins.

13. The polymer of claim 9, wherein $R^7$ is selected from the group consisting of caprolactone adducts, ethoxylates, and propoxylates.

14. The polymer of claim 9, wherein the molar ratio of urea units to urethane units in the polymer is at least about 3:1.

15. The polymer of claim 9, wherein the hydroxyl compound is a glycol.

16. The polymer of claim 15, wherein the glycol is diethylene glycol.

17. The polymer of claim 9, wherein the polyisocyanate has three isocyanate groups.

18. A polymer comprising a urea-urethane repeat unit comprising the formula:

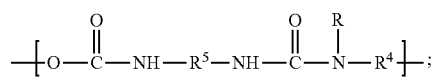

wherein $R^4$ and $R^5$ are independently selected organic groups;

wherein the polymer is made by reacting HO—$R^4$—N=CH—CH$_2$—CH$_2$—CH$_3$, HO—$R^4$—N=CH—CH(CH$_3$)—CH$_3$, HO—$R^4$—N=C(CH$_3$)—CH$_2$—CH$_3$, HO—$R^4$—N=C(CH$_3$)—CH(CH$_3$)—CH$_2$—CH$_3$, HO—$R^4$—N=C(CH$_3$)—CH$_3$, or

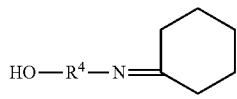

with O=C=N—R⁵—N=C=O to form urea linkages from the imine group and an isocyanate group and urethane linkages from the hydroxyl group and an isocyanate group; and wherein the R group is:
—CH=CH—CH₂—CH₃ when the reactant is HO—R⁴—N=CH—CH₂—CH₂—CH₃;
—CH=C(CH₃)—CH₃ when the reactant is HO—R⁴—N=CH—CH(CH₃)—CH₃;
—C(CH₃)=CH—CH₃ when the reactant is HO—R⁴—N=C(CH₃)—CH₂—CH₃;
—C(CH₃)=C(CH₃)—CH₂—CH₃ when the reactant is HO—R⁴—N=C(CH₃)—CH(CH₃)—CH₂—CH₃;
—C(CH₃)=CH₂ when the reactant is HO—R⁴—N=C(CH₃)—CH₃; or

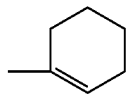

when the reactant is

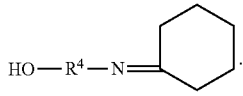

19. The polymer of claim 18, wherein R⁴ is —C₂H₄—O—C₂H₄—.

20. The polymer of claim 18, wherein R⁵ is selected from the group consisting of aliphatic and aromatic.

* * * * *